(12) United States Patent
Chen

(10) Patent No.: US 7,410,143 B2
(45) Date of Patent: Aug. 12, 2008

(54) ADJUSTING STRUCTURE

(75) Inventor: Wen-Chun Chen, Tao Yuan (TW)

(73) Assignee: Hoolin Research Company Limited, Tao Yuan (TW)

( * ) Notice: Subject to any disclaimer, the term of this patent is extended or adjusted under 35 U.S.C. 154(b) by 340 days.

(21) Appl. No.: 11/366,593

(22) Filed: Mar. 3, 2006

(65) Prior Publication Data

US 2007/0205345 A1  Sep. 6, 2007

(51) Int. Cl.
*F16M 13/00* (2006.01)
(52) U.S. Cl. .................... 248/422; 248/176.3; 248/919
(58) Field of Classification Search ............. 248/125.2, 248/125.3, 125.8, 132, 161, 157, 422, 176.3, 248/244, 295.11, 297.21, 297.31, 327, 917, 248/919–924; 361/682
See application file for complete search history.

(56) References Cited

U.S. PATENT DOCUMENTS

| | | | | |
|---|---|---|---|---|
| 5,468,051 A | * | 11/1995 | Huang | .................... 297/344.18 |
| 6,132,001 A | * | 10/2000 | Su | ......................... 297/411.36 |
| 6,766,995 B1 | * | 7/2004 | Hsieh | .......................... 248/404 |
| 7,036,787 B1 | * | 5/2006 | Lin | ............................. 248/676 |
| 7,124,984 B2 | * | 10/2006 | Yokouchi et al. | ......... 248/125.8 |
| 7,249,739 B2 | * | 7/2007 | Chueh et al. | ................ 248/133 |

* cited by examiner

*Primary Examiner*—Brian Glessner
*Assistant Examiner*—Bradley H Duckworth
(74) *Attorney, Agent, or Firm*—Troxell Law Office, PLLC

(57) ABSTRACT

An adjusting structure is located between a bracing frame and a monitor for height adjustment by using slide-type mechanisms. The adjusting structure comprises a fixing base, a slide base, and a slide means, wherein several trenches are formed on the fixing base for holding the bracing frame. Two insertion trenches are oppositely formed on both sides of the fixing base for holding the slide base. The slide means is coupled with the monitor. When the user holds the both sides of the monitor, he can exactly hook and hold a braking shaft by hands so as to release ratches from a stop device such that the slide means, which is coupled with the monitor, can be inserted into the slide base so as to engage the ratches with the racks. As a result, the adjusting structure can be rapidly, accurately, and finely shifted to a proper height.

3 Claims, 10 Drawing Sheets

US 7,410,143 B2

ADJUSTING STRUCTURE

FIELD OF THE INVENTION

The present invention relates to an adjusting structure, and more particularly to an adjusting structure located between a bracing frame and a monitor for height adjustment by using slide-type mechanisms.

BACKGROUND OF THE INVENTION

The LCD TVs and monitors are tiny and light so they are generally applied to show the public information. For the vertical and hanging types both, the use of additional bracing frames is unavoidable. The bracing frames not only facilitates the mounting of the monitors, but also can be applied to adjust angles of elevation or depression or change directions for handy reading and operation.

The conventional adjustable bracing frame is jointed, locked to the conventional monitor by a bolt. If there is a need to adjust the bracing frame, the bolt is first loosened to shift the bracing frame to a proper height followed by tightly screwing the bolt again. In this conventional manner, the user must hold the monitor by one hand and screw or unscrew the bolt by the other hand so as to protect the monitor against gravity to avoid sudden falling. As a result, the entire adjusting process is laborious. Moreover, it cannot perform the small-scoped adjusting process finely and precisely. In addition, the bolt for fixing must be screwed securely; otherwise the monitor may be fallen down.

In another improved adjustable bracing frame that has auxiliary hydraulic jack, the hydraulic jack can be applied for bracing such that the issue of laborious adjustment is thus improved. However, the hydraulic jack always provides the constant bracing force and the use of the bolt is still unavoidable. After experience of several adjusting processes, the bolt is unavoidable abraded so the achieved screwing effect is reduced. Therefore, the screwing effect must be reviewed to avoid the risk of falling after every adjusting process.

SUMMARY OF THE INVENTION

A main object of the present invention is to provide an adjusting structure between a bracing frame and a monitor for being rapidly, accurately, and finely shifted to the proper height by using slide-type mechanisms.

Another object of the present invention is to provide a light and handy adjusting structure that is simply constructed.

DETAILED DESCRIPTION OF THE PREFERRED EMBODIMENT

Figure 1:
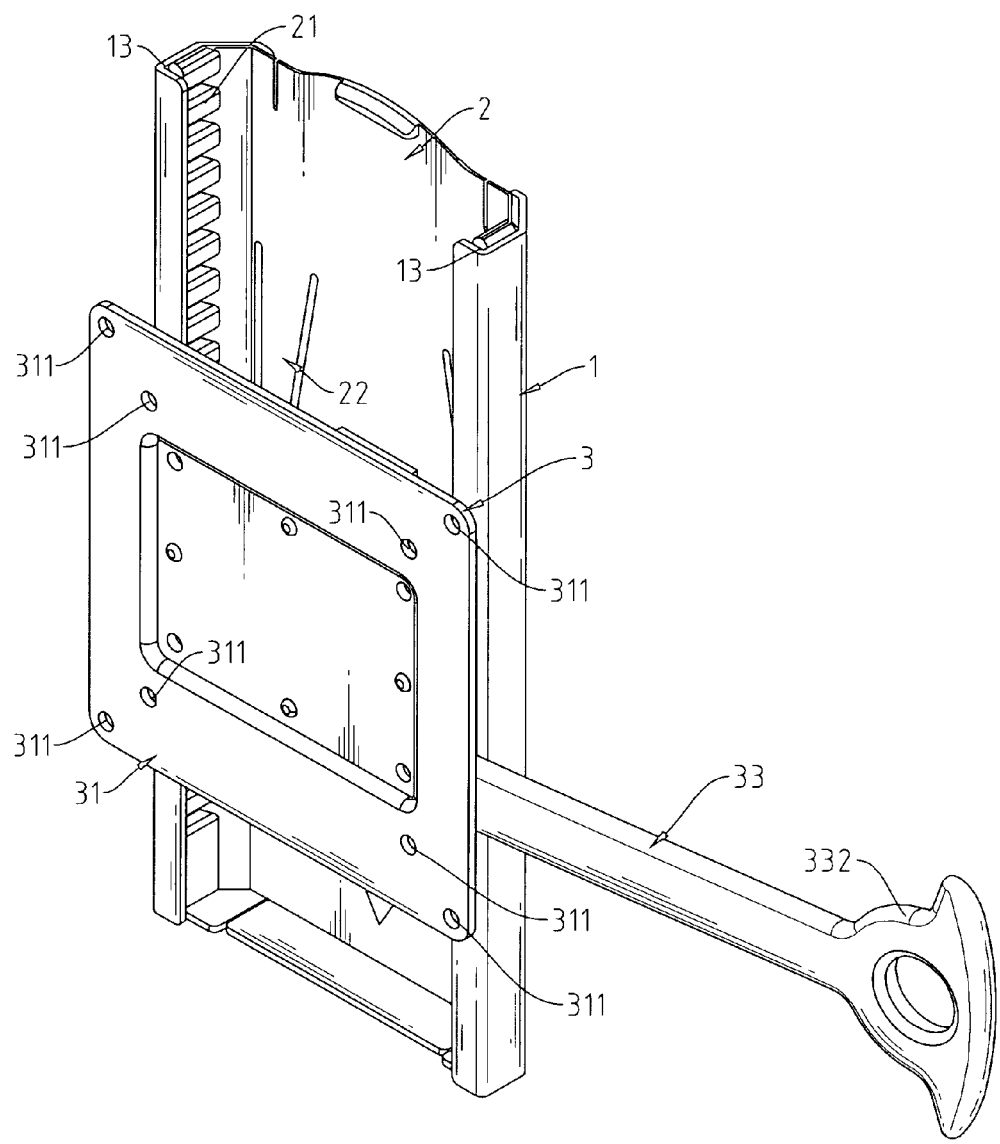
FIG. 1 is a three-dimensional view of the present invention.
Figure 2:
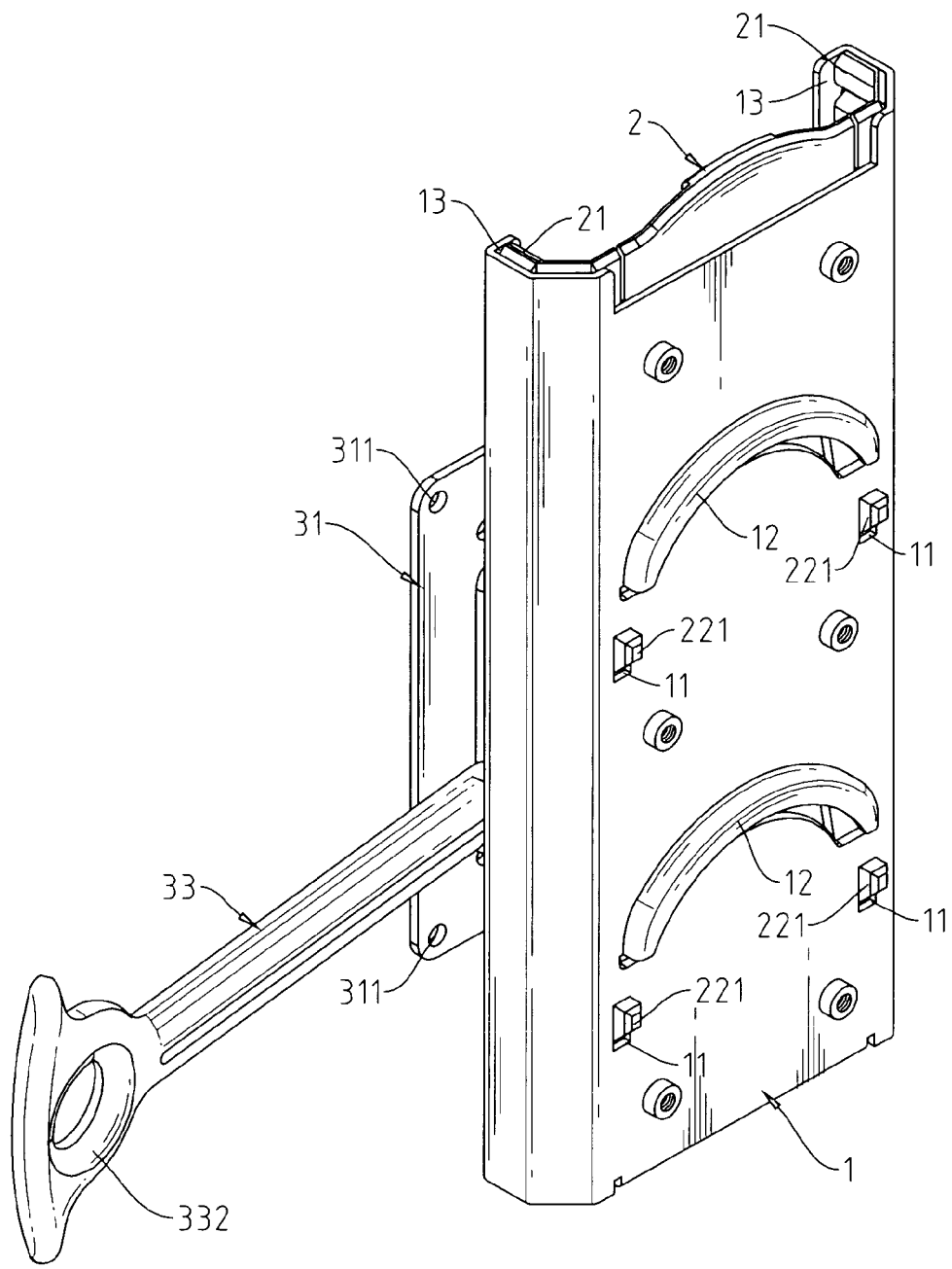
FIG. 2 is a three-dimensional view taken from another angle of FIG. 1.

Referring to FIG. 1 and FIG. 2, an adjusting structure of the present invention comprises a fixing base 1, a slide base 2, and a slide means 3.

Figure 3:
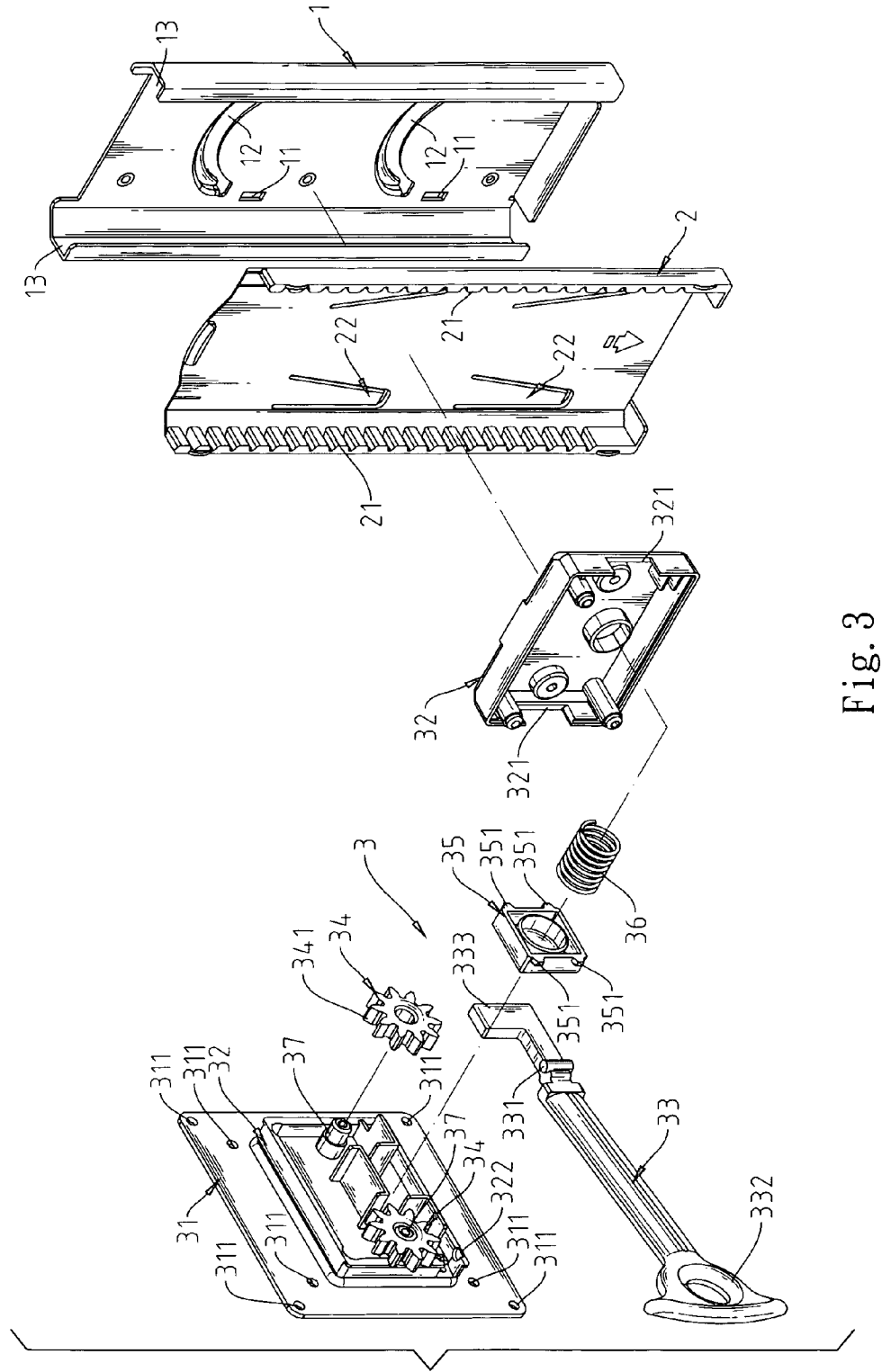
FIG. 3 is a three-dimensional, exploded view of the present invention.
Figure 4:
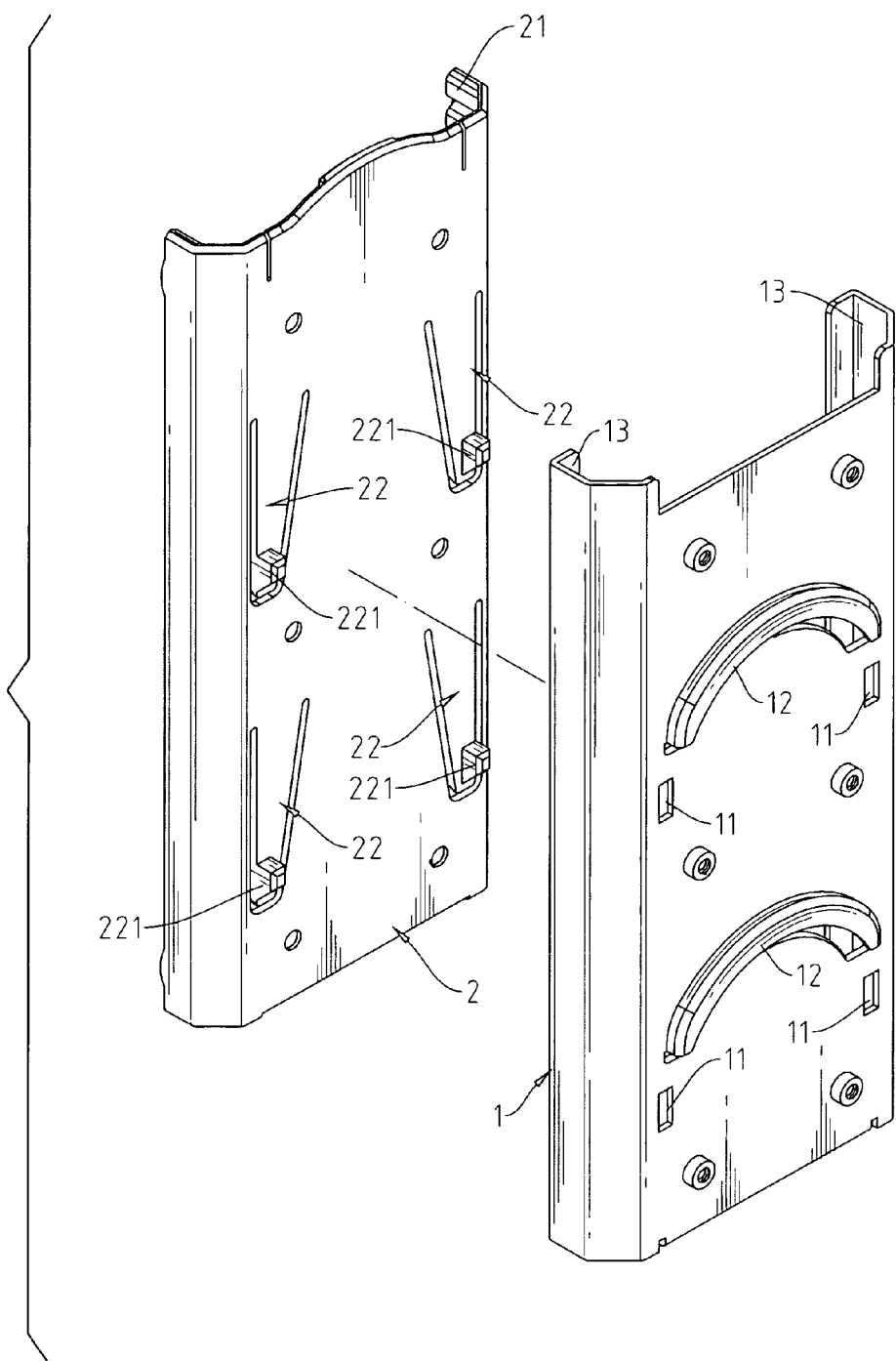
FIG. 4 is a schematic view showing the assembly between the fixing base and the slide base of the present invention.
Figure 6:
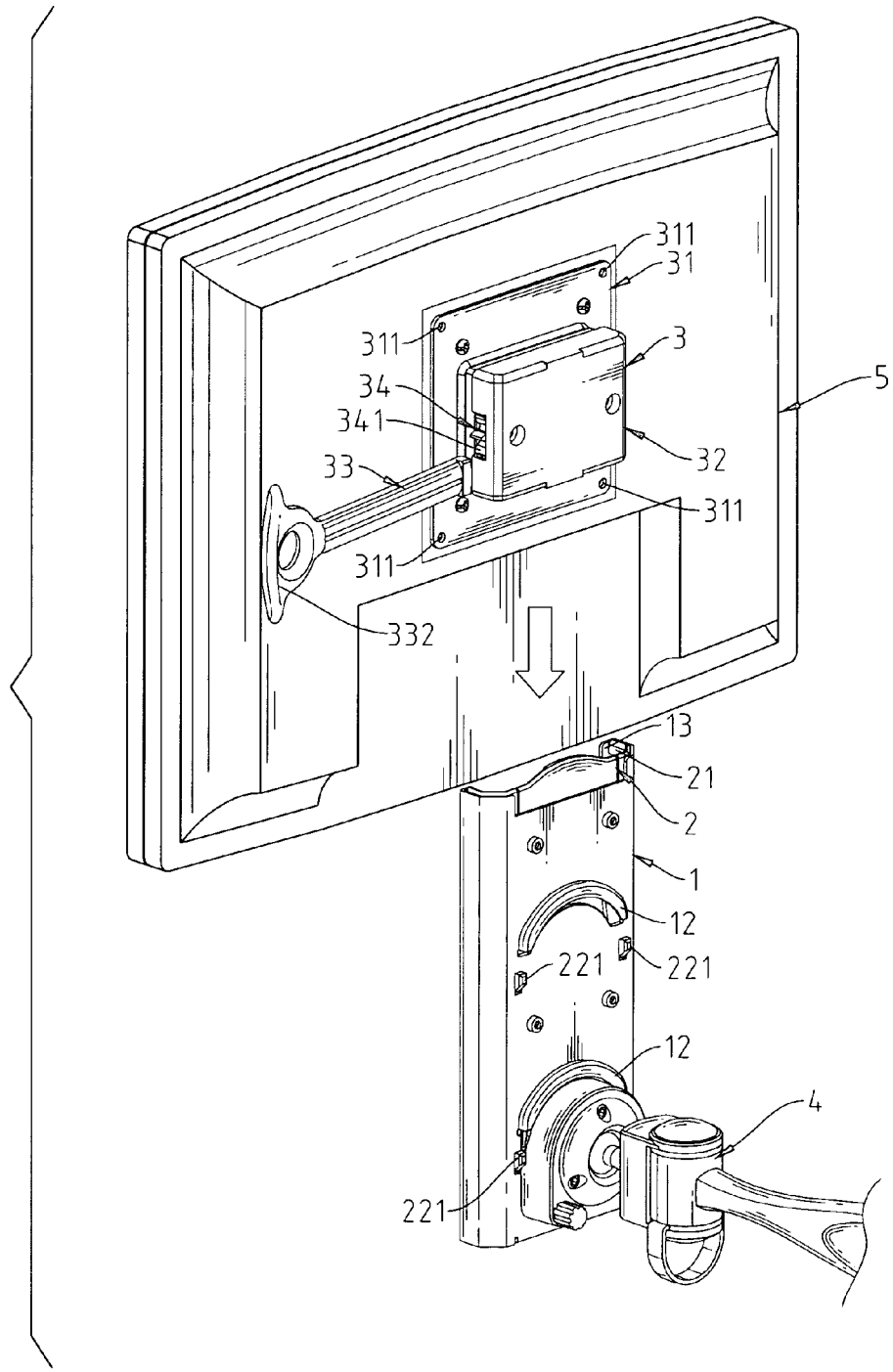
FIG. 6 is a schematic view showing the assembly between the fixing base and the monitor of the present invention.

Referring to FIG. 3 and FIG. 4, several hooking holes 11 are formed on different heights of the fixing base 1 and several trenches 12 are formed on different heights of the fixing base 1 for holding a bracing frame 4 (shown in FIG. 6). Two insertion trenches 13 are oppositely formed on both sides of the fixing base 1, wherein the width of the fixing base 1 is slightly larger than that of the slide base 2 such that the slide base 2 can be inserted therein. Two continuous ragged racks 21 are located on both sides of the slide base 2, respectively. Besides, several elastic plates 22 are expanded outward from the backside of the slide base 2, wherein several insertion pillars 221 are formed on the rear ends of the elastic plates 22 corresponding to the hooking holes 11, respectively, so as to couple the slide base 2 with the fixing base 1 securely.

Figure 5:
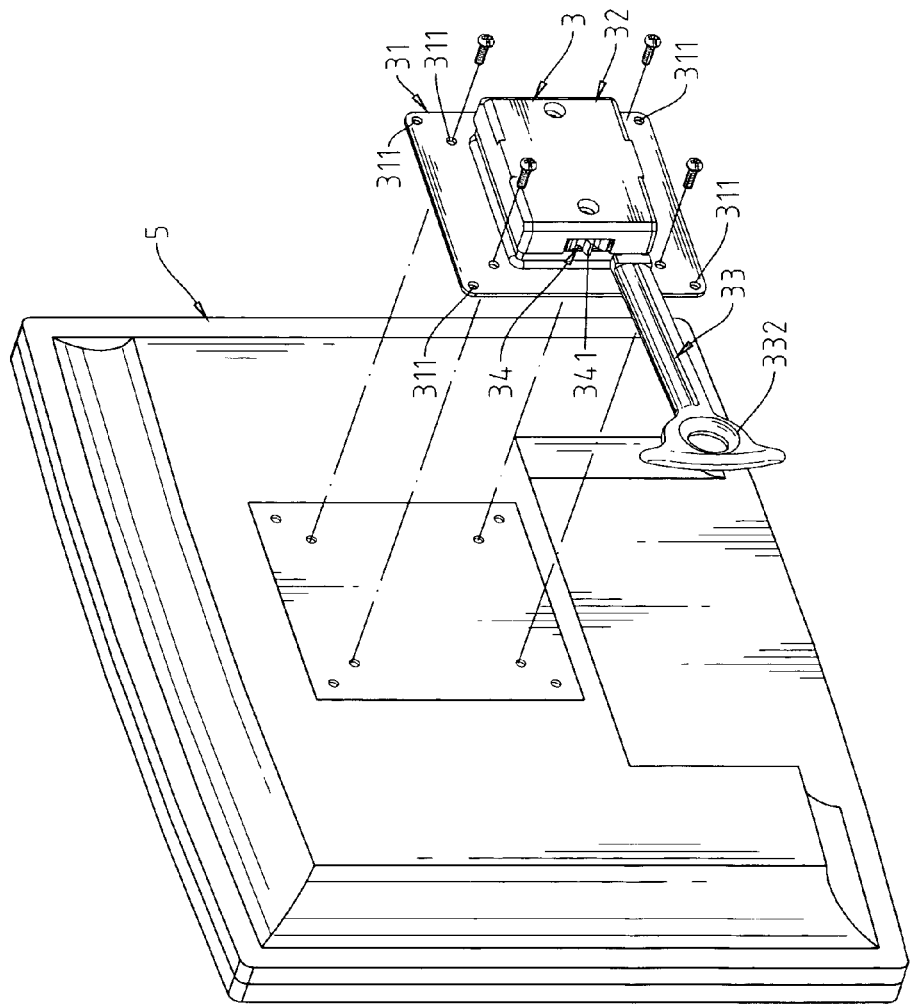
FIG. 5 is a schematic view showing the assembly between the slide means and the monitor of the present invention.

Referring to FIG. 3 and FIG. 5 simultaneously, an assembly plate 31 is located on one side of the slide means 3, wherein several locking holes 311 are formed on the assembly plate 31 for securely locking the monitor 5 (shown in FIG. 5). A braking shaft 33, two ratches 34, and a stop device 35 are located in a chamber of a shell 32 on the other side of the slide means 3. Besides, two openings 321 are formed on both sides of the shell 32, respectively. The braking shaft 33 is located to penetrate through one side of the shell 32 such that a center branch rod 331 of the braking shaft 33 is transversely, pivotally connected to two U-shaped trenches 322 formed oppositely on one side of the shell 32. By holding a holding part 332 located on one end of the braking shaft 33, a bracing part 333 located on the other end of the braking shaft 33 can be driven to perform upward and downward movements in accordance with the principle of lever. The stop device 35 is connected to a top end of the bracing part 333 of the braking shaft 33 and provided with two parallel blocks 351 located on both sides thereof, respectively. In addition, a compression spring 36 is located between the stop device 35 and the shell 32. In normal state, the stop device 35 is pushed and fixed by the elastic force of the compression spring 36. Two wheel shafts 37 are located on both sides of the stop device 35 to insert into the ratches 34, respectively. Teeth 341 of the ratches 34 are slightly exposed to the opening 321 of the shell 32 so as to engage with the blocks 351 of the stop device 35, thereby achieving the purpose of stopping and fixing.

The embodying method and preferred embodiment of the present invention are illustrated in FIG. 5 and FIG. 6. Referring to FIG. 5 and FIG. 6, the slide base 2 is inserted from the top end of the fixing base 1, wherein the elastic plates 22 of the slide base 2 are compressed by the definite space of the fixing base 1 to shrink inward. Once the slide base 2 is completely coupled with the fixing base 1, the elastic plates 22 are slid down to the hooking holes 11 of the fixing base 1 so as to insert the insertion pillars 221 into the hooking holes 11 by using the elastic force of the elastic plates 22. Moreover, the monitor 5 is pre-locked to the assembly plate 31 of the slide means 3, as shown in FIG. 5.

Figure 7:
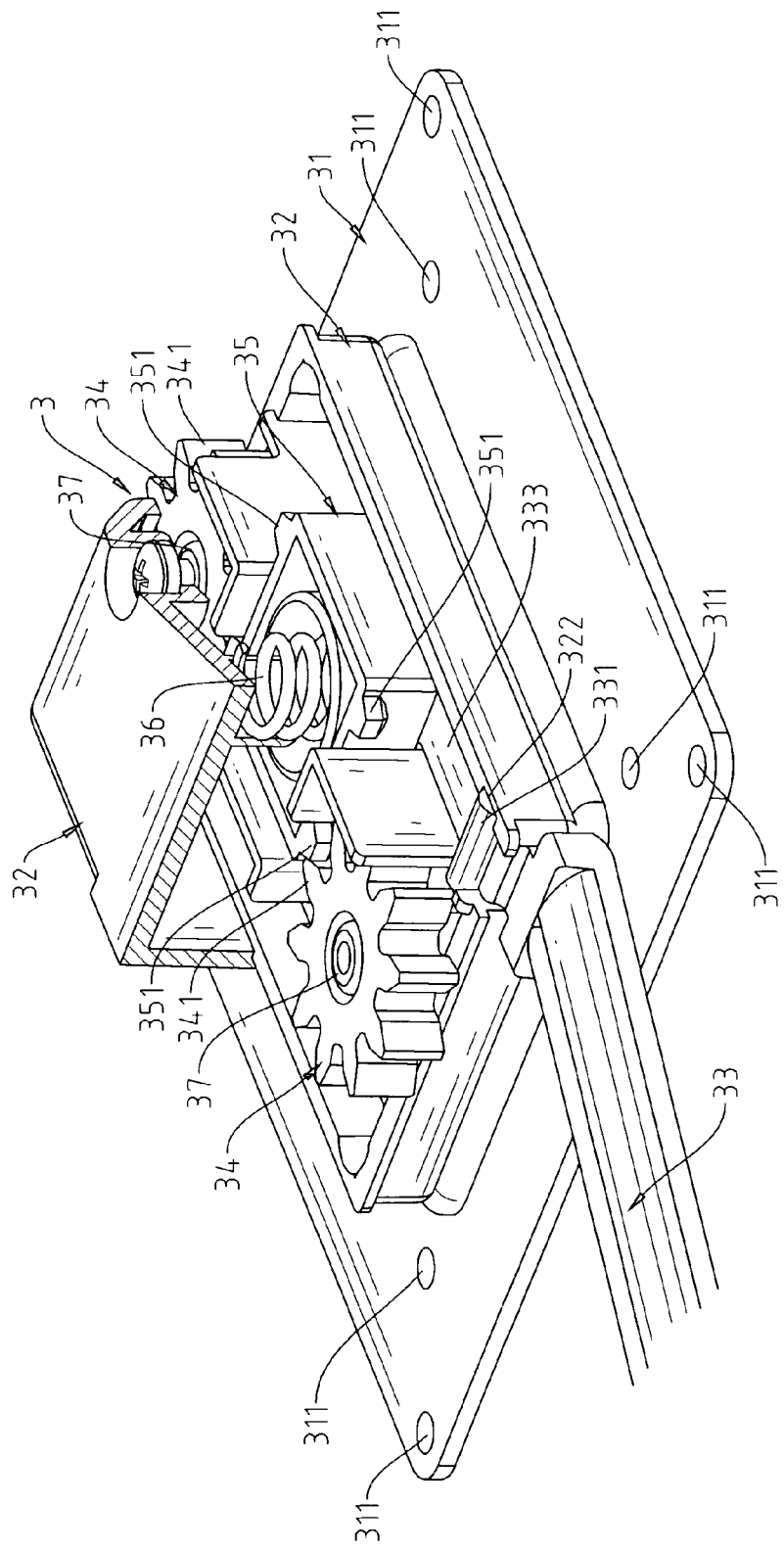
FIG. 7 is a cross-sectional view showing the internal structures of the slide means of the present invention.
Figure 8:
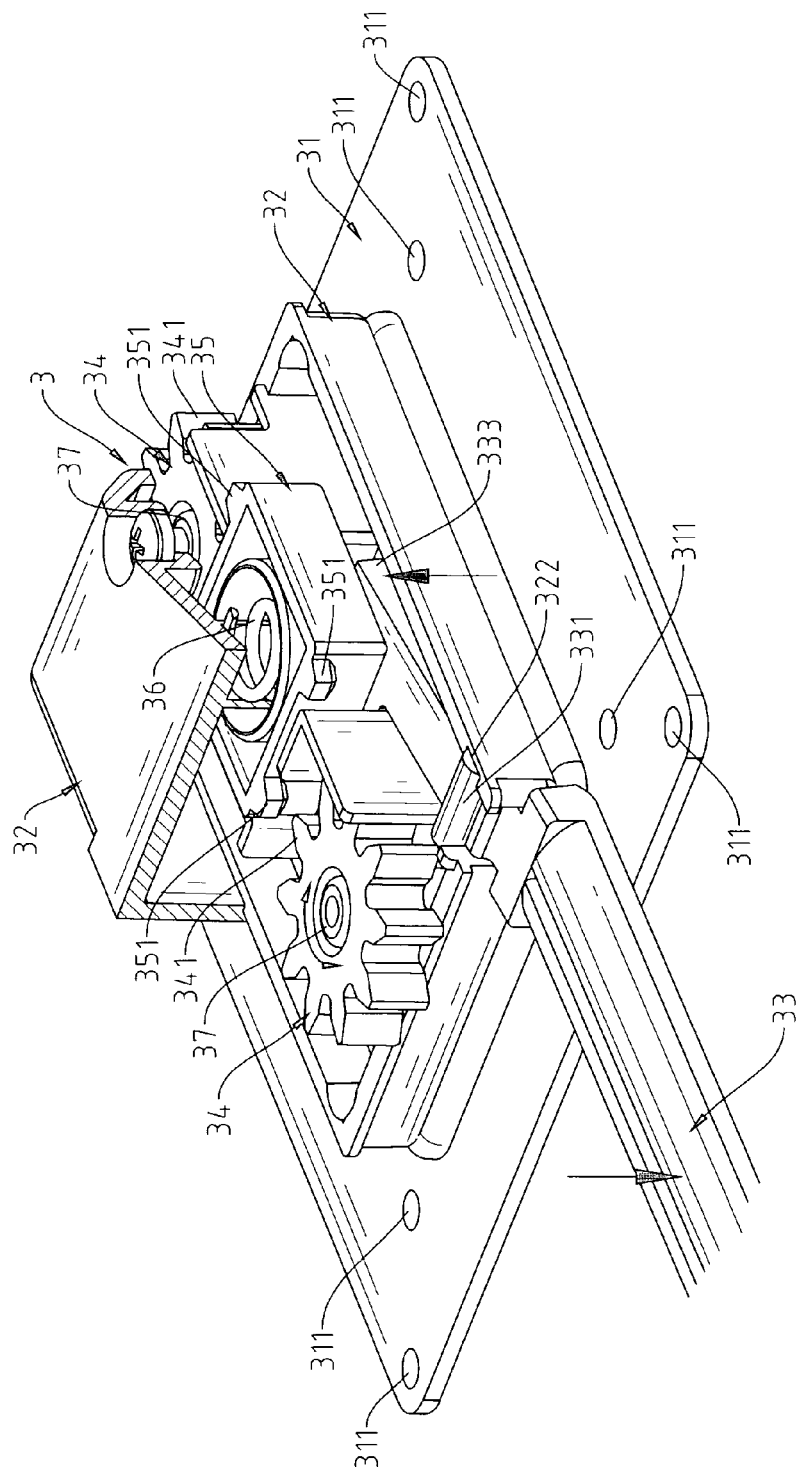
FIG. 8 is a schematic view showing an embodying status of the slide means of the present invention.
Figure 9:
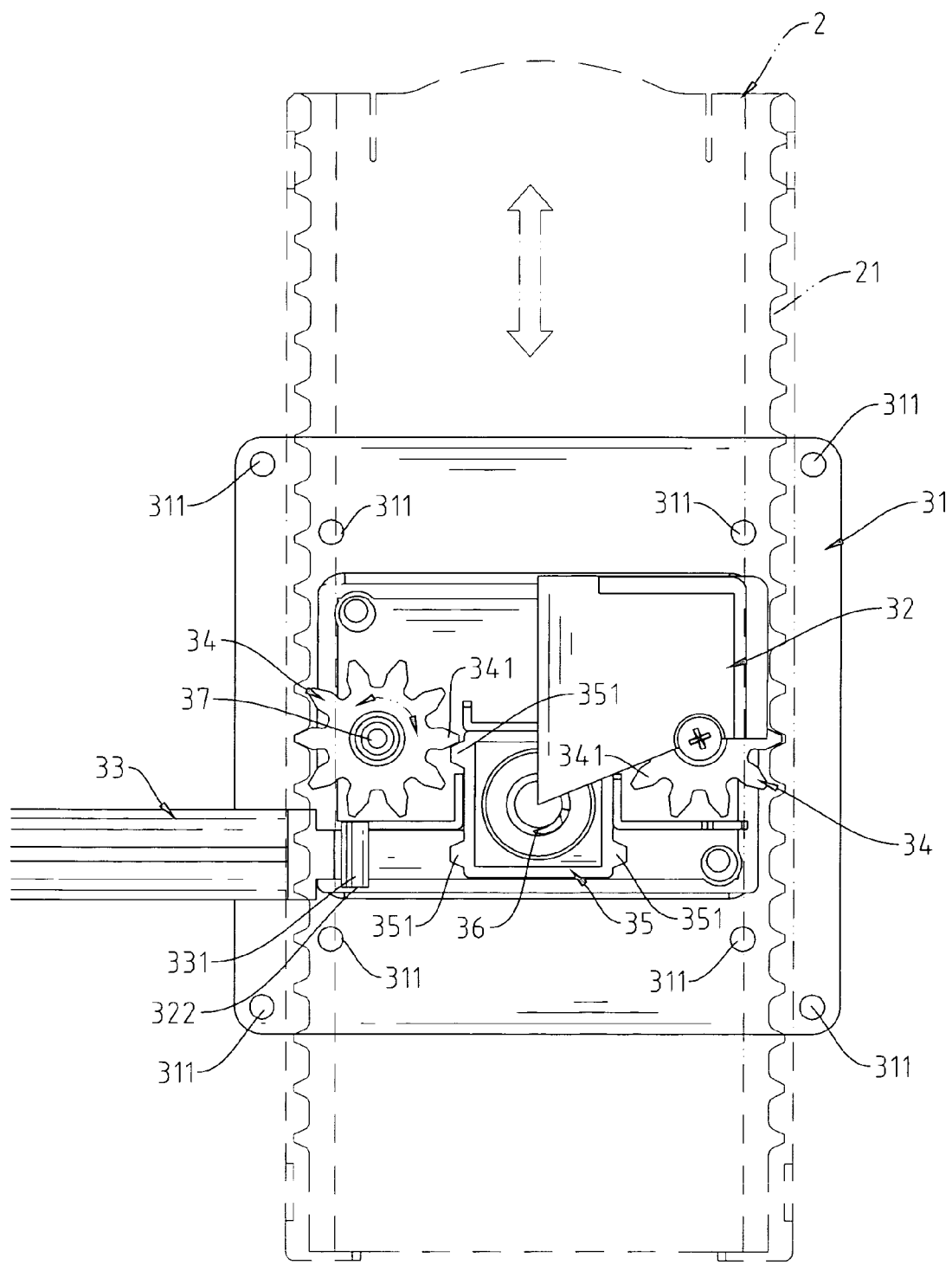
FIG. 9 is a schematic view showing another embodying status of the slide means of the present invention.
Figure 10:
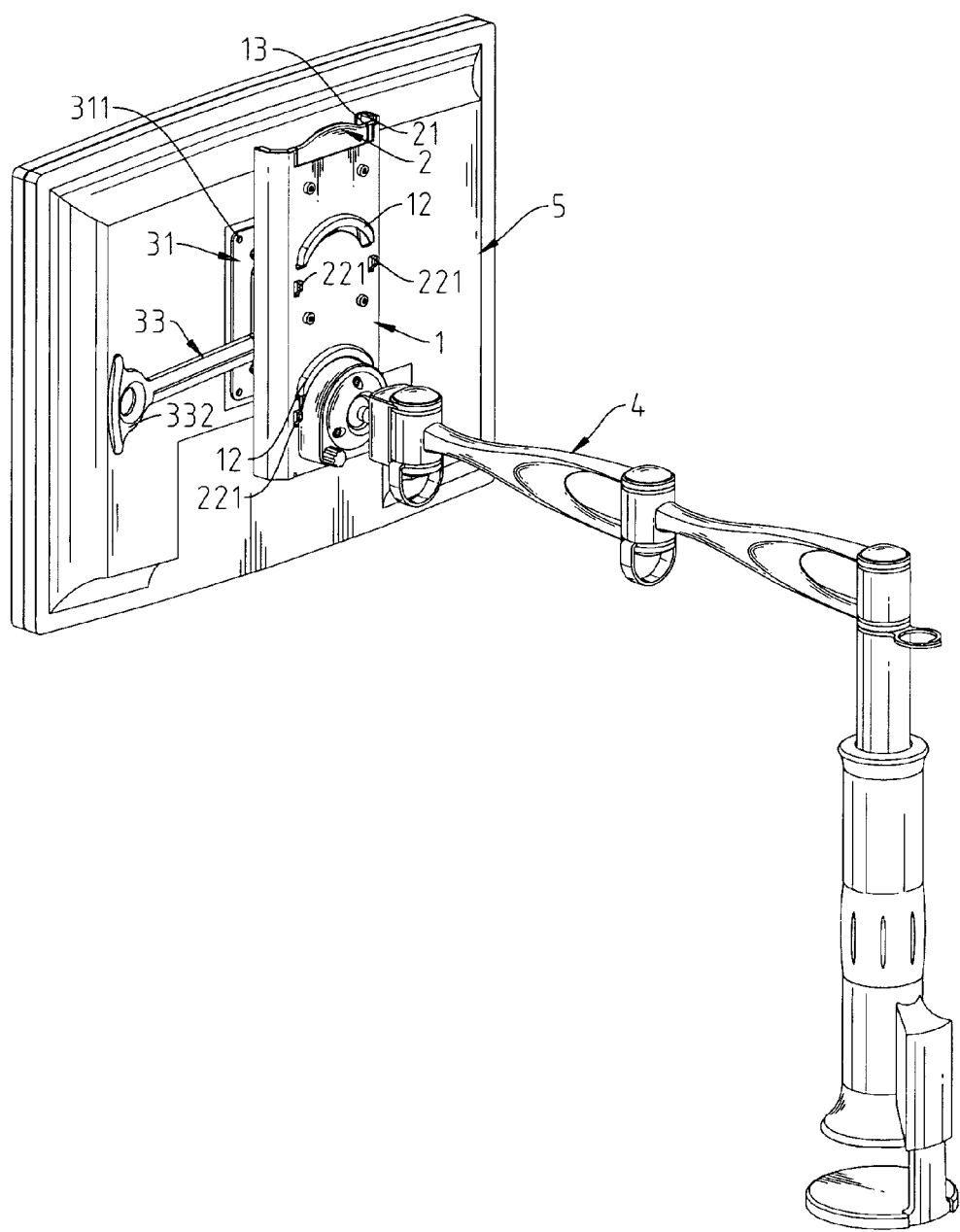
FIG. 10 is schematic view showing that the fixing base is coupled with a LCD monitor in accordance with the preferred embodiment of the present invention.

Referring to FIG. 6 through FIG. 9, after the slide means 3 is coupled with the monitor 5, the braking shaft 33 is transversely extended from the slide means 3 to the lateral edge of the monitor 5. When the user holds the both sides of the monitor 5, he can exactly hook and hold the holding part 332 by hands, as shown in FIG. 6. As a result, by using the principle of lever, the bracing part 333 can raise the stop device 35 to press it on the compression spring 36, as shown in FIG. 8. At this moment, the teeth 341 of the ratches 34 can be separated from the blocks 351 for free rotation. As a result, the slide means 3, which is coupled with the monitor 5, can be engaged with the racks 21 so as to adjust the height, as shown in FIG. 9. When the user releases the braking shaft 33, the stop device 35 can be pushed to its initial position by the elastic force of the compression spring 36 such that the blocks 351 can be located to block the teeth 341 of the ratches 34 again, as shown in FIG. 7, so as to securely locate the monitor 5 on any height of the slide base 2.

To sum up, the adjusting structure of the present invention can be rapidly, accurately shifted to a proper height by operating the braking shaft and locked securely.

What the invention claimed is:

1. An adjusting structure comprising:
 a fixing base having a plurality of hooking holes and two insertion trenches oppositely on both sides thereof for holding a slide base, wherein the fixing base has a width slightly larger than that of the slide base;
 the slide base having two racks oppositely on both sides thereof, a plurality of elastic plates expanded outward from the backside of the slide base, wherein a plurality of insertion pillars are formed on rear ends of the elastic plates, corresponding to the hooking holes, respectively, so as to couple the slide base with the fixing base; and
 a slide means having an assembly plate on one side and a braking shaft, two ratches, and a stop device located in a chamber of a shell on the other side, wherein two openings are formed on both sides of the shell, respectively, wherein the braking shaft is located to penetrate through a first side of the shell such that a center branch rod of the braking shaft is transversely, pivotally connected to two U-shaped trenches formed oppositely on the first side of the shell so as to drive a bracing part located on one end of the braking shaft to perform upward and downward movements by holding a holding part located on the other end of the braking shaft;
 wherein the stop device is located on a top end of the bracing part of the braking shaft and provided with two parallel blocks oppositely located on both sides thereof, and
 an elastic device is located on a top end of the stop device to lean against an inner wall of the shell; and
 wherein the ratches are oppositely located on two wheel shafts on both sides of the stop device and a plurality of teeth of the ratches are slightly exposed to the openings of the shell so as to engage with the blocks of the stop device for achieving the purpose of stopping and fixing, whereby the bracing part can drive the stop device to lift up the stop device by holding the holding part such that the blocks of the stop device can be separated from the teeth of the ratches for engaging the slide means with the racks via the ratches so as to adjust the height, wherein when the braking shaft is released, the stop device can be pushed downward to its initial position by the elastic force of the elastic device such that the blocks can be located to block the teeth of the ratches again for securely locating a monitor placed on the adjusting structure,
 on any height of the slide base.

2. The adjusting structure of claim 1, wherein a plurality of trenches are formed on different heights of the fixing base for holding a bracing frame.

3. The adjusting structure of claim 1, wherein the assembly plate has a plurality of locking holes formed thereon for locking a monitor.

* * * * *